US010453350B2

United States Patent
Tian et al.

(10) Patent No.: US 10,453,350 B2
(45) Date of Patent: Oct. 22, 2019

(54) FIXED-WING AIRCRAFT AND FLIGHT CONTROL METHOD AND SYSTEM THEREOF

(71) Applicant: YUNEEC TECHNOLOGY CO., LIMITED, Hong Kong (CN)

(72) Inventors: Yu Tian, Jiangsu (CN); Wenyan Jiang, Jiangsu (CN)

(73) Assignee: YUNEEC TECHNOLOGY CO., LIMITED, Hong Kong (CN)

( * ) Notice: Subject to any disclaimer, the term of this patent is extended or adjusted under 35 U.S.C. 154(b) by 242 days.

(21) Appl. No.: 15/552,264

(22) PCT Filed: May 20, 2016

(86) PCT No.: PCT/CN2016/082753
§ 371 (c)(1),
(2) Date: Aug. 18, 2017

(87) PCT Pub. No.: WO2016/184421
PCT Pub. Date: Nov. 24, 2016

(65) Prior Publication Data
US 2018/0047296 A1    Feb. 15, 2018

(30) Foreign Application Priority Data

May 20, 2015    (CN) .......................... 2015 1 0260682

(51) Int. Cl.
G08G 5/02    (2006.01)
G08G 5/00    (2006.01)
G05D 1/06    (2006.01)

(52) U.S. Cl.
CPC ........... *G08G 5/025* (2013.01); *G05D 1/0676* (2013.01); *G08G 5/00* (2013.01); *G08G 5/0021* (2013.01); *G08G 5/0034* (2013.01); *G05D 1/0615* (2013.01)

(58) Field of Classification Search
CPC ........ G08G 5/025; G08G 5/00; G08G 5/0021; G08G 5/0034; G05D 1/0676; G05D 1/0615
USPC .......................................................... 701/18
See application file for complete search history.

(56) References Cited

U.S. PATENT DOCUMENTS

| 7,070,145 B2 * | 7/2006 | Baldwin | ............. B64C 29/0033 244/137.1 |
| 2006/0032971 A1 * | 2/2006 | Baldwin | ............. B64C 29/0033 244/7 C |

* cited by examiner

*Primary Examiner* — Gertrude Arthur Jeanglaude

(57) ABSTRACT

A fixed-wing aircraft and flight control method and system thereof are provided. The flight control method includes steps of: setting a landing site of the fixed-wing aircraft; calculating a landing runway which starts from a runway origin and ends at the landing site and is formed by alternately connecting horizontal runways with inclined runways, wherein a horizontal distance between the runway origin and the landing site is determined according to a type of the fixed-wing aircraft, and a descent rate coefficient of the inclined runways varies with a horizontal length of the inclined runways; obtaining a current location of the fixed-wing aircraft and calculating a return route which starts from the current location of the fixed-wing aircraft and ends at the runway origin; and forming a return flight line by combining the return route with the landing runway.

17 Claims, 2 Drawing Sheets

FIXED-WING AIRCRAFT AND FLIGHT CONTROL METHOD AND SYSTEM THEREOF

CROSS REFERENCE OF RELATED APPLICATION

This is a U.S. National Stage under 35 U.S.C 371 of the International Application PCT/CN2016/082753, filed May 20, 2016, which claims priority under 35 U.S.C. 119(a-d) to CN 201510260682.4, filed May 20, 2015. All contents of the priority document are included into this application by reference.

BACKGROUND OF THE PRESENT INVENTION

Field of Invention

The present invention relates to a fixed-wing aircraft and flight control method and system thereof.

Description of Related Arts

With the development of science and technology, the fixed-wing aircraft has been more and more widely used. The movement of the fixed-wing aircraft is more complicated, so it is more difficult for an operator to control the fixed-wing aircraft, and especially when the fixed-wing aircraft lands, the operator is likely to misuse or difficult to control the landing location and speed. Once the above situations appear, the fixed-wing aircraft may be damaged, and even crashed, or bears other serious consequences. At the same time, once the fixed-wing aircraft is damaged during the landing process, the cost of the user is greatly increased, which is not conductive to the popularization and application promotion in the public.

SUMMARY OF THE PRESENT INVENTION

A technical problem to be solved is to provide a fixed-wing aircraft and flight control method and system thereof, so as to overcome a deficiency that an existing fixed-wing aircraft is damaged easily during a landing process due to misoperation, which is not conducive to application popularization of the fixed-wing aircraft.

The present invention solves the above technical problem through technical solutions as follows.

The present invention provides a flight control method of a fixed-wing aircraft, which comprises steps of:

(S1) setting a landing site of the fixed-wing aircraft;

(S2) calculating a landing runway of the fixed-wing aircraft, wherein: the landing runway starts from a runway origin and ends at the landing site and is formed by alternately connecting horizontal runways with inclined runways, a horizontal distance between the runway origin and the landing site is determined according to a type of the fixed-wing aircraft, a descent rate coefficient of the horizontal runways is zero, and a descent rate coefficient of the inclined runways varies with a horizontal length of the inclined runways;

(S3) obtaining a current location of the fixed-wing aircraft and calculating a return route of the fixed-wing aircraft, wherein: the return route starts from the current location of the fixed-wing aircraft and ends at the runway origin; and (S4) forming a return flight line by combining the return route with the landing runway, and controlling the fixed-wing aircraft to fly according to the return flight line, wherein: the landing site in the step (S1) is able to be a landing site of the fixed-wing aircraft which is designated by an operator, or a landing site of the fixed-wing aircraft which is preset through other manners; the landing runway in the step (S2) refers to a runway where the fixed-wing aircraft flies after entering a landing mode in the air, a location where the fixed-wing aircraft enters the landing mode is the runway origin, the landing runway is formed by alternately connecting the horizontal runways with the inclined runways, that is, one horizontal runway is firstly connected with one inclined runway, and then connected with another horizontal runway, and then connected with another inclined runway, and so on; or one inclined runway is firstly connected with a horizontal runway, and then connected with another inclined runway, and then connected with another horizontal runway, and so on; an amount of the horizontal runways and the inclined runways are freely determined according to a height of the runway origin and flight situations; a horizontal distance between of the runway origin and the landing site is set through a host computer of the fixed-wing aircraft, a descent rate coefficient of every horizontal runway is same and equal to zero, a descent rate coefficient of every inclined runway is different; assuming that a landing height of every incline runway is same, the longer a horizontal length of the inclined runway, the smaller the descent rate coefficient, that is, for two inclined runways with a same landing height, the descent rate coefficient of the incline runway with a longer horizontal length is smaller than that of the incline runway with a shorter horizontal length; the current location in the step (S3) is able to be represented by a three-dimensional coordinate of a position where the fixed-wing aircraft is located; the return flight line formed by the return route and the landing runway in the step (S4) starts from the current location of the fixed-wing aircraft and ends at the landing site. Through the present invention, the fixed-wing aircraft is able to automatically return without manual control of an operator, thereby reducing the damage; and meanwhile, this solution divides the return flight line of the fixed-wing aircraft into the return route and the landing runway, and adopts different calculation manners to improve the landing accuracy, thereby further achieving the automatic and intelligent flight of the fixed-wing aircraft.

Preferably, the step (S1) comprises (S11) recording an origin coordinate of the fixed-wing aircraft and taking the origin coordinate as the landing site of the fixed-wing aircraft, wherein: the origin coordinate refers to a three-dimensional coordinate of a position where the fixed-wing aircraft is located while being powered up, which comprises longitude, latitude and height; the origin coordinate is taken as the landing site, so as to allow the fixed-wing aircraft to accurately return, thereby simplifying an operation of the fixed-wing aircraft.

Preferably, the step (S1) further comprises (S12) recording a flight direction when the fixed-wing aircraft takes off and setting a flight direction when the fixed-wing aircraft lands at the landing site as same as the flight direction when the fixed-wing aircraft takes off.

Preferably, the step (S3) further comprises selecting a route with a shortest distance and a smallest corner of the fixed-wing aircraft, from routes which start from the current location of the fixed-wing aircraft and end at the runway origin, as the return route.

This technical solution is able to reduce energy and time consumption when the fixed-wing aircraft returns.

Preferably, the step (S4) further comprises one or more steps selected from a group consisting of:

adjusting each channel control output of the fixed-wing aircraft in real-time through a nine-axis sensor of the fixed-wing aircraft to ensure a stable flight of the fixed-wing aircraft, wherein the nine-axis sensor comprises a three-axis angular acceleration sensor, a three-axis acceleration sensor and a three-axis magneto resistive sensor for obtaining a course angle of the fixed-wing aircraft;

positioning the current location of the fixed-wing aircraft in real-time through a GPS (Global Position System) module of the fixed-wing aircraft, wherein the current location is represented by the three-dimensional coordinate of the position where the fixed-wing aircraft is located;

calculating a real-time height of the fixed-wing aircraft through a height sensor and the nine-axis sensor of the fixed-wing aircraft, wherein this step is solely not dependent on data of the height sensor to calculate the real-time height of the fixed-wing aircraft, and is dependent on data of the acceleration sensor of the nine-axis sensor to obtain a vertical displacement of the fixed-wing aircraft, and then combines with data of the height sensor to calculate the real-time height of the fixed-wing aircraft, so as to obtain the real-time height with higher accuracy; and positioning the current location of the fixed-wing aircraft in real-time through the GPS module of the fixed-wing aircraft, detecting a course angle of the fixed-wing aircraft in real-time through the nine-axis sensor of the fixed-wing aircraft, comparing the current location and the course angle with the return route, and adjusting the flight direction of the fixed-wing aircraft when the fixed-wing aircraft deviates from the return route by more than a threshold, wherein through a closed loop, the flight direction of the fixed-wing aircraft is corrected in real-time, thereby ensuring that the fixed-wing aircraft is able to fly along the return flight line and accurately land at the set landing site.

Preferably, during a landing process, a speed closed loop and a real-time flight path correction are performed.

Preferably, the speed closed loop comprises that when wind and other environmental factors have a greater impact, through adjusting an output of a throttle of the fixed-wing aircraft, a flight speed is always maintained near a set value to reduce the impact of the environmental factors, wherein the set value of the flight speed and a real-time location of the fixed-wing aircraft are related with a distance of an end of a three-dimensional runway.

Preferably, the real-time flight path correction comprises when the fixed-wing aircraft flies out of a pre-set landing runway due to interferences from the wind or the other factors, through a power adjustment or a heading adjustment, a flight posture is adjusted in real-time, in such a manner that the fixed-wing aircraft flies back to the preset runway again and lands at a set speed again.

During the landing process, the aircraft performs the speed closed loop and real-time flight path correction to ensure that the aircraft is able to land at a certain speed in accordance with the runway calculated by the step (S2) in the wind, so that the influences from the environment factors on the whole landing process are reduced, thereby further improving the landing accuracy.

Also, the present invention provides a flight control system of a fixed-wing aircraft, comprising:

a setting module for setting a landing site of the fixed-wing aircraft;

a first calculation module for calculating a landing runway of the fixed-wing to aircraft, wherein: the landing runway starts from a runway origin and ends at the landing site and is formed by alternately connecting horizontal runways with inclined runways, a horizontal distance between the runway origin and the landing site is determined according to a type of the fixed-wing aircraft, a descent rate coefficient of the horizontal runways is zero, and a descent rate coefficient of the inclined runways varies with a horizontal length of the inclined runways;

a second calculation module for obtaining a current location of the fixed-wing aircraft and calculating a return route of the fixed-wing aircraft, wherein: the return route starts from the current location of the fixed-wing aircraft and ends at the runway origin; and a return flight module for forming a return flight line by combining the return route with the landing runway, and controlling the fixed-wing aircraft to fly according to the return flight line.

Preferably, the setting module comprises a first recording module for recording an origin coordinate of the fixed-wing aircraft and taking the origin coordinate as the landing site of the fixed-wing aircraft.

Preferably, the setting module further comprises a second recording module for recording a flight direction when the fixed-wing aircraft takes off and setting a flight direction when the fixed-wing aircraft lands at the landing site as same as the flight direction when the fixed-wing aircraft takes off; and more preferably, the second recording module is adapted for selecting a route with a shortest distance and a smallest corner of the fixed-wing aircraft, from routes which start from the current location of the fixed-wing aircraft and end at the runway origin, as the return route.

Preferably, the return flight module is further adapted for one or more members selected from a group consisting of:

adjusting each channel control output of the fixed-wing aircraft in real-time through a nine-axis sensor of the fixed-wing aircraft;

positioning the current location of the fixed-wing aircraft in real-time through a GPS (Global Position System) module of the fixed-wing aircraft;

calculating a real-time height of the fixed-wing aircraft through a height sensor and the nine-axis sensor of the fixed-wing aircraft; and positioning the current location of the fixed-wing aircraft in real-time through the GPS module of the fixed-wing aircraft, detecting a course angle of the fixed-wing aircraft in real-time through the nine-axis sensor of the fixed-wing aircraft, comparing the current location and the course angle with the return route, and adjusting the flight direction of the fixed-wing aircraft when the fixed-wing aircraft deviates from the return route by more than a threshold.

Preferably, the return flight module is also adapted for performing a speed closed loop and a real-time flight path correction.

Preferably, the speed closed loop comprises that when wind and other environmental factors have a greater impact, through adjusting an output of a throttle of the fixed-wing aircraft, a flight speed is always maintained near a set value to reduce the impact of the environmental factors, wherein the set value of the flight speed and a real-time location of the fixed-wing aircraft are related with a distance of an end of a three-dimensional runway.

Preferably, the real-time flight path correction comprises when the fixed-wing aircraft flies out of a pre-set landing runway due to interferences from the wind or the other factors, through a power adjustment or a heading adjustment, a flight posture is adjusted in real-time, in such a manner that the fixed-wing aircraft flies back to the preset runway again and lands at a set speed again.

Also, the present invention provides a fixed-wing aircraft comprising the flight control system formed by any combination of the above conditions.

The above-mentioned preferred conditions may be arbitrarily combined to obtain the preferred embodiments of the present invention on the basis of common knowledge in the art.

Positive progress effects of the present invention are as follows. In the present invention, the fixed-wing aircraft and flight control method and system allow the fixed-wing aircraft to automatically return without manual control of an operator, thereby reducing the damage due to misoperation, and further achieving the automatic and intelligent flight of the fixed-wing aircraft, which is conductive to the popularization and application promotion of the fixed-wing aircraft in the public. Meanwhile, the present invention not only improves the landing accuracy through setting the return flight line, but also continuously corrects the flight direction through detecting internal components of the fixed-wing aircraft, thus further achieving the automatic and intelligent flight of the fixed-wing aircraft.

DETAILED DESCRIPTION OF THE PREFERRED EMBODIMENT

Figure 1:
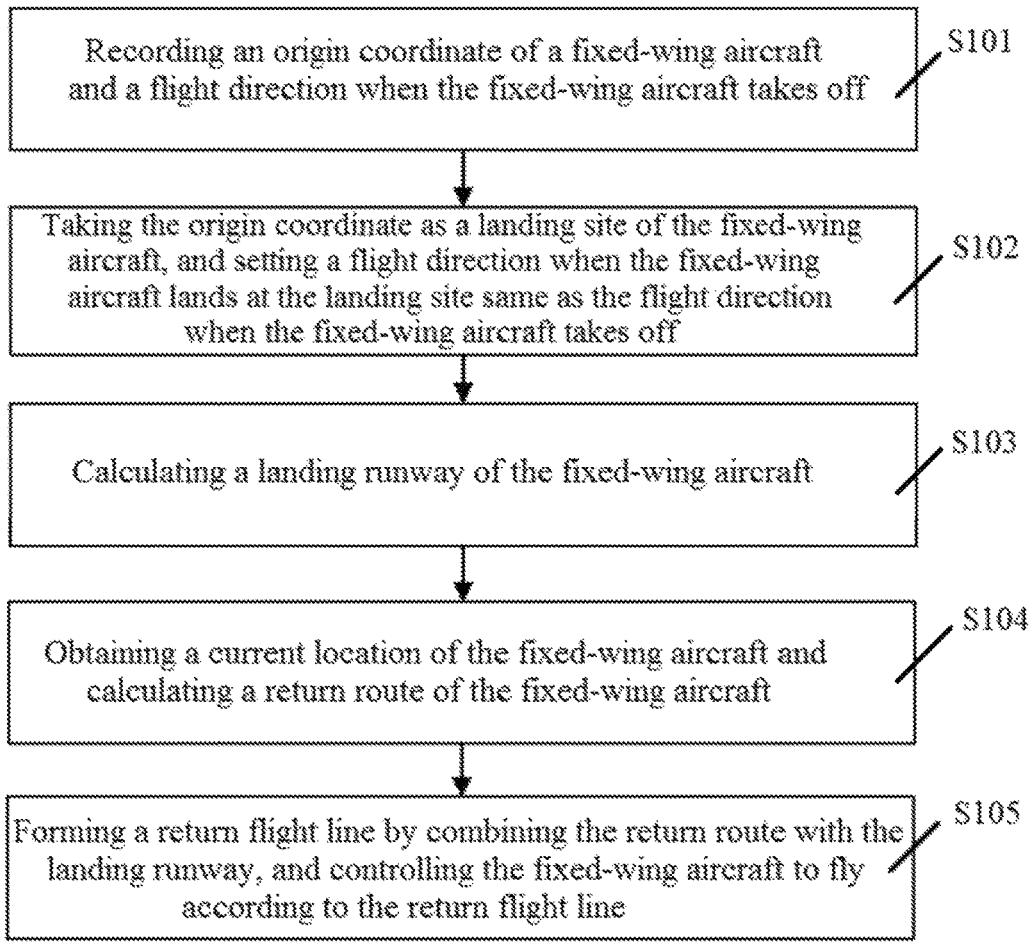
FIG. 1 a flow chart of a flight control method of a fixed-wing aircraft according to a preferred embodiment of the present invention.

The present invention is further explained with accompanying embodiments as follows, but the present invention is not limited to the described embodiments First Embodiment Referring to FIG. 1, a flight control method of a fixed-wing aircraft comprises steps of:

(S101) recording an origin coordinate of the fixed-wing aircraft and a flight direction when the fixed-wing aircraft takes off;

(S102) taking the origin coordinate as a landing site of the fixed-wing aircraft, and setting a flight direction when the fixed-wing aircraft lands at the landing site same as the flight direction when the fixed-wing aircraft takes off;

(S103) calculating a landing runway of the fixed-wing aircraft, wherein: the landing runway is a three-dimensional runway which starts from a runway origin and ends at the landing site and is formed by alternately connecting horizontal runways with inclined runways, a horizontal distance between the runway origin and the landing site is determined according to a type of the fixed-wing aircraft, a descent rate coefficient of the horizontal runways is zero, and a descent rate coefficient of the inclined runways varies with a horizontal length of the inclined runways;

(S104) obtaining a current location of the fixed-wing aircraft and calculating a return route of the fixed-wing aircraft, wherein: the return route starts from the current location of the fixed-wing aircraft and ends at the runway origin, or further, a route with a shortest distance and a smallest corner of the fixed-wing aircraft is selected from routes which start from the current location of the fixed-wing aircraft and end at the runway origin as the return route so as to reduce energy and time consumption when the fixed-wing aircraft returns, the smallest corner means that the fixed-wing aircraft turns to a direction of the runway origin with the smallest turning angle, for example, while turning 90 degrees to a left, the fixed-wing aircraft faces towards the runway origin; while turning 270 degrees to right, the fixed-wing aircraft faces towards the runway origin, so that the fixed-wing aircraft automatically chooses to turn to the left; and (S105) forming a return flight line by combining the return route with the landing runway, and controlling the fixed-wing aircraft to fly according to the return flight line, wherein during a process of the fixed-wing aircraft flying according to the return flight line, due to interferences from airflow or other external factors, the fixed-wing aircraft may be bumpy or deviate from the return flight line, so that in order to ensure stable flight and accurate return flight of the fixed-wing aircraft, the step (S105) further comprises:

adjusting each channel control output of the fixed-wing aircraft in real-time through a nine-axis sensor of the fixed-wing aircraft;

positioning the current location of the fixed-wing aircraft in real-time through a GPS (Global Position System) module of the fixed-wing aircraft;

calculating a real-time height of the fixed-wing aircraft through a height sensor and the nine-axis sensor of the fixed-wing aircraft, and ensuring the real-time height consistent with the return flight line of the fixed-wing aircraft through a closed-loop control; and positioning the current location of the fixed-wing aircraft in real-time through the GPS module of the fixed-wing aircraft, detecting a course angle of the fixed-wing aircraft in real-time through the nine-axis sensor of the fixed-wing aircraft, comparing the current location and the course angle with the return route, and adjusting the flight direction of the fixed-wing aircraft when the fixed-wing aircraft deviates from the return route by more than a threshold.

During the landing process, a speed closed loop and a real-time flight path correction are performed. The speed closed loop comprises that when the wind and other environmental factors have a greater impact, through adjusting an output of a throttle of the fixed-wing aircraft, a flight speed is always maintained near a set value to reduce the impact of the environmental factors, wherein, the set value of the flight speed and the real-time location of the fixed-wing aircraft are related with a distance of an end of the three-dimensional runway. The real-time flight path correction comprises when the fixed-wing aircraft flies out of a pre-set landing runway due to interferences from the wind or the other factors, through a power adjustment or a heading adjustment, a flight posture is adjusted in real-time, in such a manner that the fixed-wing aircraft flies back to the preset runway again and lands at a set speed again. During the landing process, the aircraft performs the speed closed loop and real-time flight path correction to ensure that the aircraft is able to land at a certain speed in accordance with the runway calculated by the step (S102) in the wind, so that influences from the environment factors on the whole landing process are reduced, thereby further improving the landing accuracy.

Figure 2:
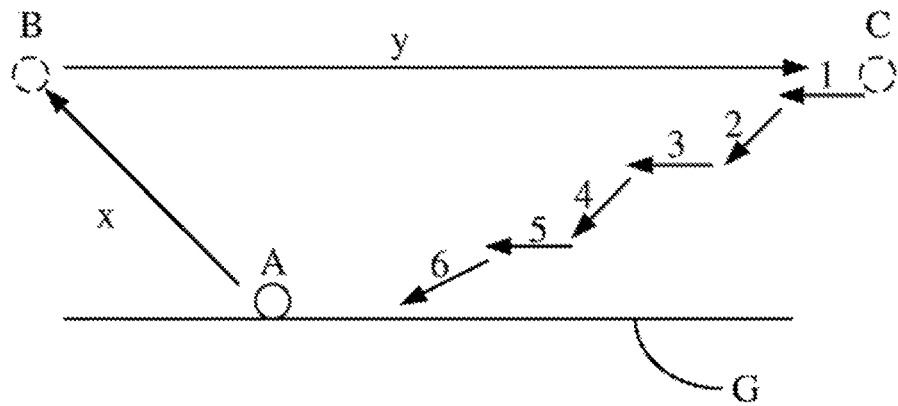
FIG. 2 shows a flight process of the flight control method of the fixed-wing aircraft according to the preferred embodiment of the present invention.

FIG. 2 is taken as an example to explain the flight process of the fixed-wing aircraft. In FIG. 2, G represents ground, when the fixed-wing aircraft is powered up, the fixed-wing aircraft is located at a location A, namely, a coordinate of the location A is the origin coordinate and a coordinate of the landing site; the fixed-wing aircraft takes off along a direction of an arrow X to a location B, namely, a coordinate of the location B is a current location of the fixed-wing aircraft, a location C is a calculated runway origin; a flight line from the location B to the location A defines the return flight line which comprises a return route Y from the location B to the location C and a landing runway from the location C to the location A. It can be seen from FIG. 2 that the landing runway is able to be a section runway which is formed by alternately connecting horizontal runways and inclined runways, wherein a first section, a third section and a fifth section are horizontal runways, and a second, fourth and sixth section are inclined runways; the descent rate coefficient of every horizontal runway is same and equal to zero, the landing height of every inclined runway is same, the horizontal length of the second inclined runway is smaller than that of the fourth inclined runway and that of the sixth inclined runway, the descent rate coefficient of the second inclined runway is larger than that of the fourth inclined runway and that of the sixth inclined runway.

Figure 3:
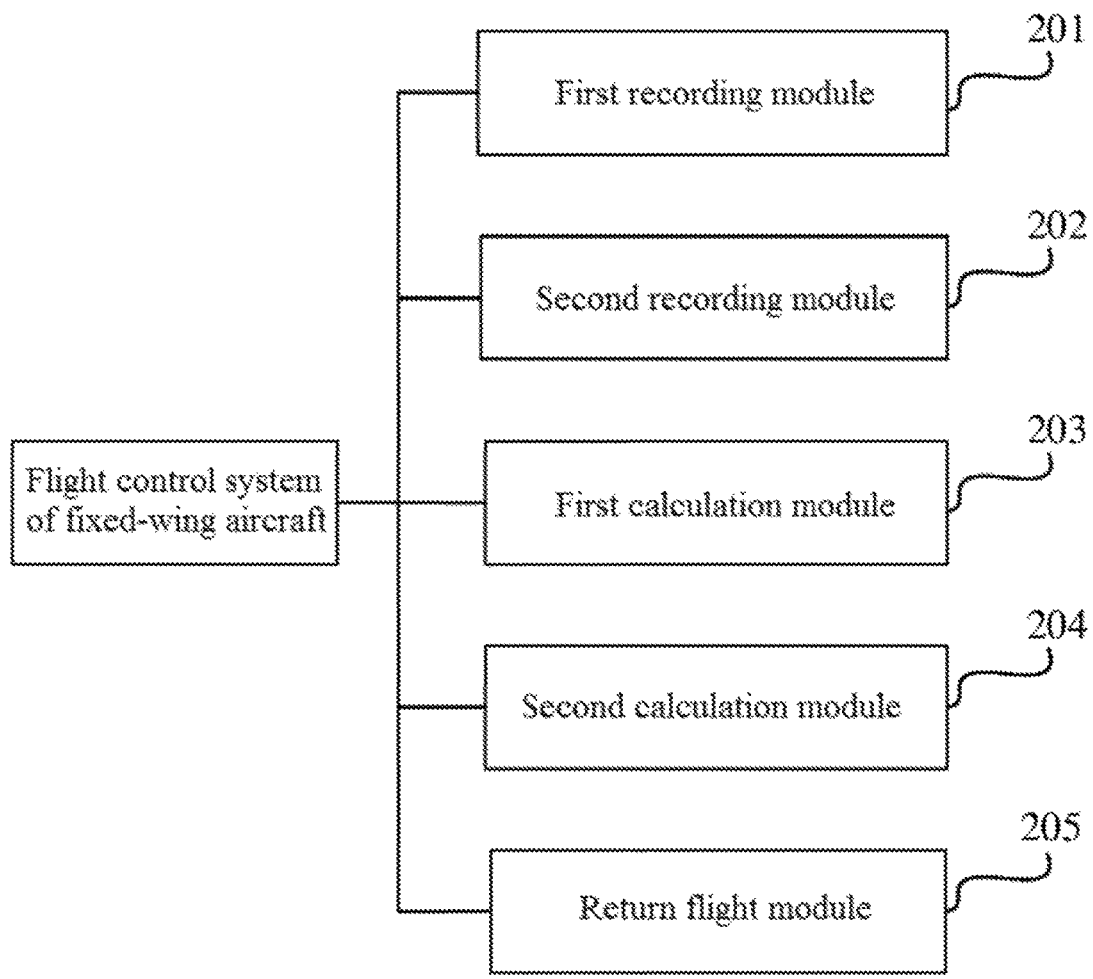
FIG. 3 is a structural schematic view of a flight control system of the fixed-wing aircraft according to the preferred embodiment of the present invention.

Referring to FIG. 3, a flight control system of a fixed-wing aircraft according this embodiment comprises:

a first recording module 201 for recording an origin coordinate of the fixed-wing aircraft and taking the origin coordinate as a landing site of the fixed-wing aircraft;

a second recording module 202 for recording a flight direction when the fixed-wing aircraft takes off and setting a flight direction when the fixed-wing aircraft lands at the landing site as same as the flight direction when the fixed-wing aircraft takes off;

a first calculation module 203 for calculating a landing runway of the fixed-wing aircraft, wherein: the calculated landing runway is a three-dimensional runway which starts from a runway origin and ends at the landing site and is formed by alternately connecting horizontal runways with inclined runways, a horizontal distance between the runway origin and the landing site is determined according to a type of the fixed-wing aircraft, a descent rate coefficient of the horizontal runways is zero, and a descent rate coefficient of the inclined runways varies with a horizontal length of the inclined runways;

a second calculation module 204 for obtaining a current location of the fixed-wing aircraft and calculating a return route of the fixed-wing aircraft, wherein: the return route starts from the current location of the fixed-wing aircraft and ends at the runway origin, or further, a route with a shortest distance and a smallest corner of the fixed-wing aircraft is selected from routes which start from the current location of the fixed-wing aircraft and end at the runway origin as the return route so as to reduce energy and time consumption when the fixed-wing aircraft returns; and a return flight module 205 for forming a return flight line of the fixed-wing aircraft by combining the return route with the landing runway, and controlling the fixed-wing aircraft to fly according to the return flight line, wherein the return flight module 205 is further adapted for:

adjusting each channel control output of the fixed-wing aircraft in real-time through a nine-axis sensor of the fixed-wing aircraft;

positioning the current location of the fixed-wing aircraft in real-time through a GPS (Global Position System) module of the fixed-wing aircraft;

calculating a real-time height of the fixed-wing aircraft through a height sensor and the nine-axis sensor of the fixed-wing aircraft; and positioning the current location of the fixed-wing aircraft in real-time through the GPS module of the fixed-wing aircraft, detecting a course angle of the fixed-wing aircraft in real-time through the nine-axis sensor of the fixed-wing aircraft, comparing the current location and the course angle with the return route, and adjusting the flight direction of the fixed-wing aircraft when the fixed-wing aircraft deviates from the return route by more than a threshold.

The return flight module 205 is also adapted for performing a speed closed loop and a real-time flight path correction. The speed closed loop comprises that when the wind and other environmental factors have a greater impact, through adjusting an output of a throttle of the fixed-wing aircraft, a flight speed is always maintained near a set value to reduce the impact of the environmental factors, wherein, the set value of the flight speed and the real-time location of the fixed-wing aircraft are related with a distance of an end of the three-dimensional runway. The real-time flight path correction comprises when the fixed-wing aircraft flies out of a pre-set landing runway due to interferences from wind or other factors, through a power adjustment or a heading adjustment, a flight posture is adjusted in real-time, in such a manner that the fixed-wing aircraft flies back to the preset runway again and lands at a set speed again.

In this embodiment, the fixed-wing aircraft comprises the aircraft control system, the nine-axis sensor, the GPS module, the height sensor and other components of an existing fixed-wing aircraft.

In spite that the specific embodiments of the present invention have been described above, it will be understood by those skilled in the art that these are illustrative only and that the protective scope of the present invention is defined by the appended claims. It will be apparent to those skilled in the art that various changes and modifications can be made therein without departing from the principles and spirit of the present invention, but such changes and modifications are within the protective scope of the present invention.

What is claimed is:

1. A flight control method of a fixed-wing aircraft comprising steps of:
   (S1) setting a landing site of the fixed-wing aircraft;
   (S2) calculating a landing runway of the fixed-wing aircraft, wherein: the landing runway starts from a runway origin and ends at the landing site and is formed by alternately connecting horizontal runways with inclined runways, a horizontal distance between the runway origin and the landing site is determined according to a type of the fixed-wing aircraft, a descent rate coefficient of the horizontal runways is zero, and a descent rate coefficient of the inclined runways varies with a horizontal length of the inclined runways;
   (S3) obtaining a current location of the fixed-wing aircraft and calculating a return route of the fixed-wing aircraft, wherein: the return route starts from the current location of the fixed-wing aircraft and ends at the runway origin; and
   (S4) forming a return flight line by combining the return route with the landing runway, and controlling the fixed-wing aircraft to fly according to the return flight line.

2. The flight control method, as recited in claim 1, wherein the step (S1) comprises (S11) recording an origin coordinate of the fixed-wing aircraft and taking the origin coordinate as the landing site of the fixed-wing aircraft.

3. The flight control method, as recited in claim 2, wherein the step (S1) further comprises (S12) recording a flight direction when the fixed-wing aircraft takes off and setting a flight direction when the fixed-wing aircraft lands at the landing site as same as the flight direction when the fixed-wing aircraft takes off.

4. The flight control method, as recited in claim 1, wherein the step (S3) further comprises selecting a route with a shortest distance and a smallest corner of the fixed-wing aircraft, from routes which start from the current location of the fixed-wing aircraft and end at the runway origin, as the return route.

5. The flight control method, as recited in claim 1, wherein the step (S4) further comprises one or more steps selected from a group consisting of:
   adjusting each channel control output of the fixed-wing aircraft in real-time through a nine-axis sensor of the fixed-wing aircraft;
   positioning the current location of the fixed-wing aircraft in real-time through a GPS (Global Position System) module of the fixed-wing aircraft;
   calculating a real-time height of the fixed-wing aircraft through a height sensor and the nine-axis sensor of the fixed-wing aircraft; and
   positioning the current location of the fixed-wing aircraft in real-time through the GPS module of the fixed-wing aircraft, detecting a course angle of the fixed-wing aircraft in real-time through the nine-axis sensor of the fixed-wing aircraft, comparing the current location and the course angle with the return route, and adjusting the flight direction of the fixed-wing aircraft when the fixed-wing aircraft deviates from the return route by more than a threshold.

6. The flight control method, as recited in claim 1, wherein during a landing process, a speed closed loop and a real-time flight path correction are performed.

7. The flight control method, as recited in claim 6, wherein the speed closed loop comprises that when wind and other environmental factors have a greater impact, through adjusting an output of a throttle of the fixed-wing aircraft, a flight speed is always maintained near a set value to reduce the impact of the environmental factors, here, the set value of the flight speed and a real-time location of the fixed-wing aircraft are related with a distance of an end of a three-dimensional runway.

8. The flight control method, as recited in claim 6, wherein the real-time flight path correction comprises when the fixed-wing aircraft flies out of a pre-set landing runway due to interferences from the wind or the other factors, through a power adjustment or a heading adjustment, a flight posture is adjusted in real-time, in such a manner that the fixed-wing aircraft flies back to the preset runway again and lands at a set speed again.

9. A flight control system of a fixed-wing aircraft, comprising:
   a setting module for setting a landing site of the fixed-wing aircraft;
   a first calculation module for calculating a landing runway of the fixed-wing aircraft, wherein: the landing runway starts from a runway origin and ends at the landing site and is formed by alternately connecting horizontal runways with inclined runways, a horizontal distance between the runway origin and the landing site is determined according to a type of the fixed-wing aircraft, a descent rate coefficient of the horizontal runways is zero, and a descent rate coefficient of the inclined runways varies with a horizontal length of the inclined runways;
   a second calculation module for obtaining a current location of the fixed-wing aircraft and calculating a return route of the fixed-wing aircraft, wherein: the return route starts from the current location of the fixed-wing aircraft and ends at the runway origin; and
   a return flight module for forming a return flight line by combining the return route with the landing runway, and controlling the fixed-wing aircraft to fly according to the return flight line.

10. The flight control system, as recited in claim 9, wherein the setting module comprises a first recording module for recording an origin coordinate of the fixed-wing aircraft and taking the origin coordinate as the landing site of the fixed-wing aircraft.

11. The flight control system, as recited in claim 10, wherein the setting module further comprises a second recording module for recording a flight direction when the fixed-wing aircraft takes off and setting a flight direction when the fixed-wing aircraft lands at the landing site as same as the flight direction when the fixed-wing aircraft takes off.

12. The flight control system, as recited in claim 9, wherein the second calculation module is further adapted for selecting a route with a shortest distance and a smallest corner of the fixed-wing aircraft, from routes which start from the current location of the fixed-wing aircraft and end at the runway origin, as the return route.

13. The flight control system, as recited in claim 9, wherein the return flight module is further adapted for one or more members selected from a group consisting of:
   adjusting each channel control output of the fixed-wing aircraft in real-time through a nine-axis sensor of the fixed-wing aircraft;
   positioning the current location of the fixed-wing aircraft in real-time through a GPS (Global Position System) module of the fixed-wing aircraft;
   calculating a real-time height of the fixed-wing aircraft through a height sensor and the nine-axis sensor of the fixed-wing aircraft; and
   positioning the current location of the fixed-wing aircraft in real-time through the GPS module of the fixed-wing aircraft, detecting a course angle of the fixed-wing aircraft in real-time through the nine-axis sensor of the fixed-wing aircraft, comparing the current location and the course angle with the return route, and adjusting the flight direction of the fixed-wing aircraft when the fixed-wing aircraft deviates from the return route by more than a threshold.

14. The flight control system, as recited in claim 9, wherein the return flight module is also adapted for performing a speed closed loop and a real-time flight path correction.

15. The flight control system, as recited in claim 14, wherein the speed closed loop comprises that when wind and other environmental factors have a greater impact, through adjusting an output of a throttle of the fixed-wing aircraft, a flight speed is always maintained near a set value to reduce the impact of the environmental factors, here, the set value of the flight speed and a real-time location of the fixed-wing aircraft are related with a distance of an end of a three-dimensional runway.

16. The flight control system, as recited in claim 14, wherein the real-time flight path correction comprises when the fixed-wing aircraft flies out of a pre-set landing runway due to interferences from the wind or the other factors, through a power adjustment or a heading adjustment, a flight posture is adjusted in real-time, in such a manner that the fixed-wing aircraft flies back to the preset runway again and lands at a set speed again.

17. A fixed-wing aircraft comprising the flight control system as recited in claim 9.

* * * * *